United States Patent
Long et al.

(10) Patent No.: US 12,316,410 B2
(45) Date of Patent: May 27, 2025

(54) TIMING ERROR ESTIMATION/COMPENSATION FOR 5G NR DOWNLINK SYSTEMS WITH UNCALIBRATED ANTENNAS

(71) Applicant: Telefonaktiebolaget LM Ericsson (publ), Stockholm (SE)

(72) Inventors: Jianguo Long, Ottawa (CA); Shaohua Li, Kanata (CA); Yongquan Qiang, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 322 days.

(21) Appl. No.: 17/802,255

(22) PCT Filed: Feb. 22, 2021

(86) PCT No.: PCT/IB2021/051490
§ 371 (c)(1),
(2) Date: Aug. 25, 2022

(87) PCT Pub. No.: WO2021/171167
PCT Pub. Date: Sep. 2, 2021

(65) Prior Publication Data
US 2023/0079185 A1    Mar. 16, 2023

Related U.S. Application Data

(60) Provisional application No. 62/981,724, filed on Feb. 26, 2020.

(51) Int. Cl.
*H04B 7/04*    (2017.01)
*H04B 7/0456*    (2017.01)
(Continued)

(52) U.S. Cl.
CPC ............. *H04B 7/0469* (2013.01); *H04B 7/10* (2013.01); *H04B 17/104* (2015.01); *H04B 17/12* (2015.01)

(58) Field of Classification Search
CPC ....... H04B 7/10; H04B 17/104; H04B 7/0469
See application file for complete search history.

(56) References Cited

U.S. PATENT DOCUMENTS

| | | | |
|---|---|---|---|
| 2013/0064277 A1* | 3/2013 | Liao | H04B 17/12 375/224 |
| 2015/0215023 A1 | 7/2015 | Thurfjell | |

(Continued)

OTHER PUBLICATIONS

Non-Final Office Action issued in U.S. Appl. No. 17/770,785 dated Jun. 16, 2023, consisting of 16 pages.

(Continued)

*Primary Examiner* — Sulaiman Nooristany
(74) *Attorney, Agent, or Firm* — Weisberg I.P. Law, P.A.

(57) ABSTRACT

A method and network node for timing error estimation and compensation for Fifth Generation (5G) New Radio (NR) downlink (DL) systems with uncalibrated antennas are provided. According to one aspect, a method in a network node includes transmitting a first Channel State Information Reference Signal (CSI-RS) having a first timing compensation and transmitting a second CSI-RS having a second timing compensation, receiving a CSI-RS resource indicator (CRI) in a CSI report from a wireless device (WD), and determining from the CRI which of the first and second timing compensation results in a greater spectrum efficiency.

16 Claims, 15 Drawing Sheets

(51) Int. Cl.
  *H04B 7/10* (2017.01)
  *H04B 17/10* (2015.01)
  *H04B 17/12* (2015.01)

(56) References Cited

U.S. PATENT DOCUMENTS

| | | |
|---|---|---|
| 2017/0187109 A1 | 6/2017 | Wang et al. |
| 2017/0234971 A1 | 8/2017 | Arai |
| 2018/0351621 A1 | 12/2018 | Wei et al. |
| 2021/0226676 A1 | 7/2021 | Gresset |

OTHER PUBLICATIONS

International Search Report and Written Opinion dated Jun. 1, 2021 issued in PCT Application No. PCT/IB2021/051490 filed Feb. 22, 2021, consisting of 20 pages.
International Search Report and Written Opinion dated Apr. 1, 2020 issued in PCT Application No. PCT/IB2019/059078 filed Oct. 23, 2019, consisting of 14 pages.
3GPP TS 38.214 V15.4.0; 3rd Generation Partnership Project; Technical Specification Group Radio Access Network; NR; Physical Layer Procedures for Data (Release 15); Dec. 2018, consisting of 102 pages.
3GPP TSG RAN WG1 Meeting #66bis; R1-113333; Agenda Item: 7.5.5.1.1; Source: Alcatel-Lucent Shanghai Bell, Alcatel-Lucent; Title: On Handling of Timing Misalignment and Antenna Calibration; Document for: Discussion and Decision; Zhuhai, China, Oct. 10-14, 2011, consisting of 4 pages.
3GPP TSF-RAN WG1 Meeting #66bis; R1-113153; Agenda Item: 7.5.5.1.1; Source: Nokia Siemens Networks, Nokia; Title: Discussion of Time Misalignment and Antenna Array Calibration; Document for: Discussion and Decision; Zhuhai, China, Oct. 10-14, 2011, consisting of 4 pages.

\* cited by examiner

TIMING ERROR ESTIMATION/COMPENSATION FOR 5G NR DOWNLINK SYSTEMS WITH UNCALIBRATED ANTENNAS

CROSS-REFERENCE TO RELATED APPLICATIONS

This application is a Submission Under 35 U.S.C. § 371 for U.S. National Stage Patent Application of International Application No.: PCT/IB2021/051490, filed Feb. 22, 2021 entitled "TIMING ERROR ESTIMATION/COMPENSATION FOR 5G NR DOWNLINK SYSTEMS WITH UNCALIBRATED ANTENNAS," which claims priority to U.S. Provisional Application No. 62/981,724, filed Feb. 26, 2020, entitled "TIMING ERROR ESTIMATION/COMPENSATION FOR 5G NR DOWNLINK SYSTEMS," the entireties of both of which are incorporated herein by reference.

TECHNICAL FIELD

The present disclosure relates to wireless communication and in particular, to timing error estimation and compensation for Fifth Generation (5G) New Radio (NR) downlink (DL) systems with uncalibrated antennas.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

FIG. 1 shows 4 correlated downlink transmit antennas. This is one of the most commonly used 4-antenna set ups for LTE base stations (eNBs) and will likely also be used in NR low band systems. The four antennas are cross-polarized, i.e., the antennas are either placed with a slant angle 45° (polarization A) or −45° (polarization B). Two cross-polarized antenna pairs are closely spaced with 0.5 to 1λ separation. The advantage of such a configuration is that it provides excellent beamforming gain because the co-polarized antennas (antenna pair 0 and 1 or antenna pair 2 and 3) are correlated. The configuration also allows reasonable multiplexing gain of up to 4 layers because of a combination of polarization diversity and sufficient spatial diversity.

Beamforming with correlated antennas requires that the phase difference between individual antenna elements is small. Any antenna error that affects phase relations could prevent systems from realizing full beamforming potential. Ideally, to achieve beamforming gain, the antennas showed in FIG. 1 should be calibrated. However, due to cost, the 4 transmit antennas of FIG. 1 used in the LTE base station (eNB) are uncalibrated. As the wireless industry evolves into 5G, those radio-antenna systems will be reused. When antennas are uncalibrated, the signal over each antenna will have different phase $\varnothing_k$, k=0, 1, 2, 3.

For each pair of correlated co-polarized antennas, i.e., antenna pair 0 and 1 for polarization A or antenna pair 2 and 3 for polarization B, the main lobe of the radiation pattern of the antenna pair points in the direction where the phases of antenna signals are added constructively. Hence, beam direction depends on the phase difference between two co-polarized antennas. When the phase difference between two correlated antennas changes, the beam direction will change as illustrated by FIG. 2.

The phase difference between antennas in each co-polarized antenna pair can be expressed approximately as:

$$\varnothing_A = \varnothing_1 - \varnothing_0$$

and $$\varnothing_B = \varnothing_3 - \varnothing_2$$

If the antennas are calibrated, i.e., $\varnothing_k=0$ for all k=0, 1, 2, 3, $\varnothing_A=\varnothing_B=0$ and the beams from two polarizations are aligned and point to bore sight, as illustrated by the solid line in FIG. 2.

If the antennas are not calibrated, i.e., $\varnothing_k=0$ for all k=0, 1, 2, 3, but the phase differences of two polarizations are the same, i.e., $\varnothing_A=\varnothing_B\neq 0$, the beams from two polarizations are still aligned while beam direction will be deviated from bore sight. For example, when $\varnothing_A=\varnothing_B=135°$, the beams of two polarizations can be illustrated by the dashed line in FIG. 2.

However, when the phase difference from two beams is not equal, i.e., $\varnothing_A\neq\varnothing_B$, two beams will point to different directions. The example shown in FIG. 1 can be considered such as a case when $\varnothing_A=0°$ and $\varnothing_A=135°$. In this case, if the phase error is not corrected, there will be power loss when the network node (radio base station) sends signals to the WD.

The phase error of each antenna $\varnothing_k$, k=0, 1, 2, 3, has two components, a frequency independent static phase $\varphi_k$ and a frequency dependent phase caused by timing delay $\Delta t_k$, i.e., $$\varnothing_k = -2\pi f \Delta t_k + \varphi_k, \ k=0,1,2,3$$

The static phase error $\varphi_k$ can be compensated. Hence, assume $\varphi_k=0$, k=0, 1, 2, 3. And the phase error is given by $$\varnothing_k = -2\pi f \Delta t_k + \varphi_k, \ k=0,1,2,3$$

The phase difference between antennas in each co-polarized antenna pair becomes:

$$\varnothing_A = \varnothing_1 - \varnothing_0 = 2\pi f(\Delta t_1 - \Delta t_0)$$

and $$\varnothing_B = \varnothing_3 - \varnothing_2 = 2\pi f(\Delta t_3 - \Delta t_2).$$

As $\varnothing_A$ and $\varnothing_B$ are frequency dependent, there are two consequences as illustrated in FIG. 3. First, the phase error will result in an effect called beam squint, i.e., the beam of a specific polarization will point to different directions at different subcarrier frequencies when the timing delays of co-polarized antennas are different. Second, the beams of two polarizations will not be aligned if $\Delta t_1 - \Delta t_0 \neq \Delta t_3 - \Delta t_2$.

These two issues cannot be corrected with a 5G NR downlink type I codebook. First, the beam direction component of the precoder matrix indicator (PMI) report is defined as wideband. When the beam of a polarization points to different directions at different subbands, the network node cannot perform per subband phase compensation. Instead, a compromised wideband phase compensation is used which may result in performance degradation. Second, the 5G NR type 1 codebook assumes that the beams of two polarization point to the same direction. The 5G NR type 1 codebook is not capable of compensating the phase error of each polarization separately to align the beams Hence, for systems with four correlated and uncalibrated antennas, the NR type I codebook will have poor performance due to beam misalignment caused by antenna timing error.

The 5G NR type I codebook assumes beams from two polarizations always point to the same direction over whole cell bandwidth. However, this is not the case for systems with uncalibrated antennas, as timing error of antennas can cause frequency dependent beam misalignment. Performance will be poor when applying the NR type I codebook to systems with uncalibrated antennas.

SUMMARY

Some embodiments advantageously provide a method and system for timing error estimation and compensation for Fifth Generation (5G) New Radio (NR) downlink (DL) systems with uncalibrated antennas.

Some embodiments provide estimation and compensation of antenna timing error in 5G NR downlink systems with correlated and uncalibrated antennas. These methods and systems estimate and compensate antenna timing errors of 5G NR downlink systems with uncalibrated antennas. Some embodiments may include systems and mechanisms to inject timing offsets to a set of transmitted CSI-RS signals; methods to detect the timing error of antennas by configuring WD to report CRI in CSI report for the timing offset injected; and methods to apply timing compensation to downlink signals.

According to one aspect, a method in a network node for timing compensation of a co-polarized antenna pair is provided. The method includes transmitting a first Channel State Information Reference Signal, CSI-RS, having a first timing compensation and transmitting a second CSI-RS having a second timing compensation. The method also includes receiving a CSI-RS resource indicator, CRI, in a CSI report from a wireless device, WD. The method further includes determining from the CRI which of the first and second timing compensation results in a greater spectrum efficiency.

According to this aspect, in some embodiments, the method further includes iteratively performing the transmitting, receiving and determining until a timing compensation that results in a maximum spectrum efficiency at the WD is determined. In some embodiments, the timing compensation that results in the maximum spectrum efficiency is determined according to a linear search algorithm. In some embodiments, the timing compensation that results in the maximum spectrum efficiency is determined according to a non-linear search algorithm. In some embodiments, the timing compensation that results in a maximum spectrum efficiency is determined periodically. In some embodiments, determining a timing compensation that results in a maximum spectrum efficiency is performed for a first polarization of a set of co-polarized antenna pairs, followed by determining a timing compensation that results in a maximum spectrum efficiency for a second polarization of the set of co-polarized antenna pairs. In some embodiments, for each polarization, one antenna is used as a reference antenna and a timing compensation is determined for each antenna of a polarization relative to the reference antenna. In some embodiments, the first and second timing compensation are incremental after a first iteration. In some embodiments, the method further includes transmitting an information element restricting a time for which the WD makes a measurement of a channel between the network node and the WD to prevent the WD from measuring the channel across multiple sequentially transmitted CSI-RS. In some embodiments, the method further includes configuring the WD to make a channel measurement for reporting in an uplink timeslot based on a most recent occasion of a CSI-RS received by the WD.

According to another aspect, a network node is configured for timing compensation of a co-polarized antenna pair. The network node includes a radio interface configured to: transmit a first Channel State Information Reference Signal, CSI-RS, having a first timing compensation and transmitting a second CSI-RS having a second timing compensation; and receive a CSI-RS resource indicator, CRI, in a CSI report from a wireless device, WD. The network node also includes processing circuitry in communication with the radio interface. The processing circuitry is configured to determine from the CRI which of the first and second timing compensation results in a greater spectrum efficiency.

According to this aspect, in some embodiments, the processing circuitry and the radio interface are configured to iteratively perform the transmitting, receiving and determining until a timing compensation that results in a maximum spectrum efficiency at the WD is determined. In some embodiments, the timing compensation that results in the maximum spectrum efficiency is determined according to a linear search algorithm. In some embodiments, the timing compensation that results in the maximum spectrum efficiency is determined according to a non-linear search algorithm. In some embodiments, the timing compensation that results in a maximum spectrum efficiency is determined periodically. In some embodiments, the network node further includes a set of co-polarized antenna pairs in communication with the radio interface, and wherein determining a timing compensation that results in a maximum spectrum efficiency is performed for a first polarization of the set of co-polarized antenna pairs, followed by determining a timing compensation that results in a maximum spectrum efficiency for a second polarization of the set of co-polarized antenna pairs. In some embodiments, one antenna is used as a reference antenna and a timing compensation is determined for each antenna of a polarization relative to the reference antenna. In some embodiments, the first and second timing compensation are incremental after a first iteration. In some embodiments, wherein the processing circuitry and the radio interface are configured to transmit an information element restricting a time for which the WD makes a measurement of a channel between the network node and the WD to prevent the WD from measuring the channel across multiple sequentially transmitted CSI-RS. In some embodiments, the network node is further configured to configure the WD to make a channel measurement for reporting in an uplink timeslot based on a most recent occasion of a CSI-RS received by the WD.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
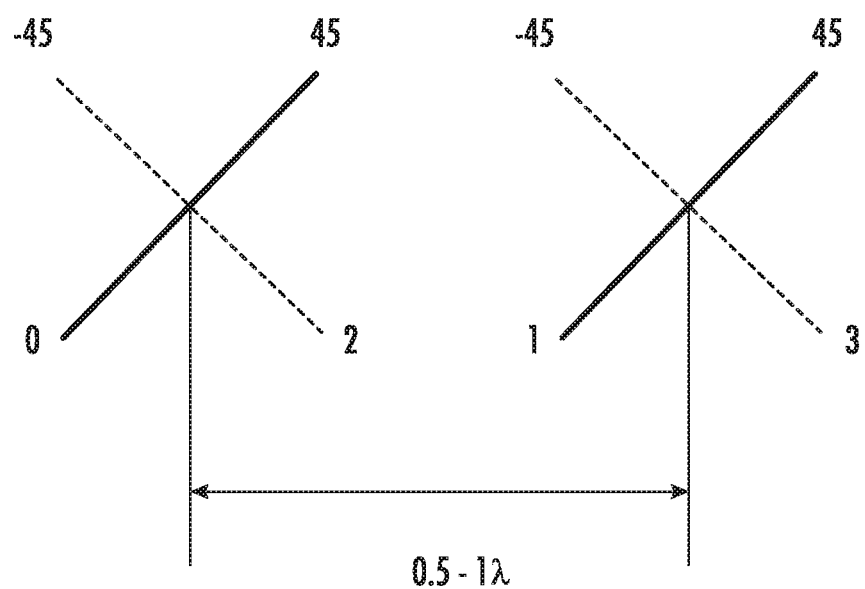
FIG. 1 is an illustration of 4 correlated downlink transmit antenna.
Figure 2:
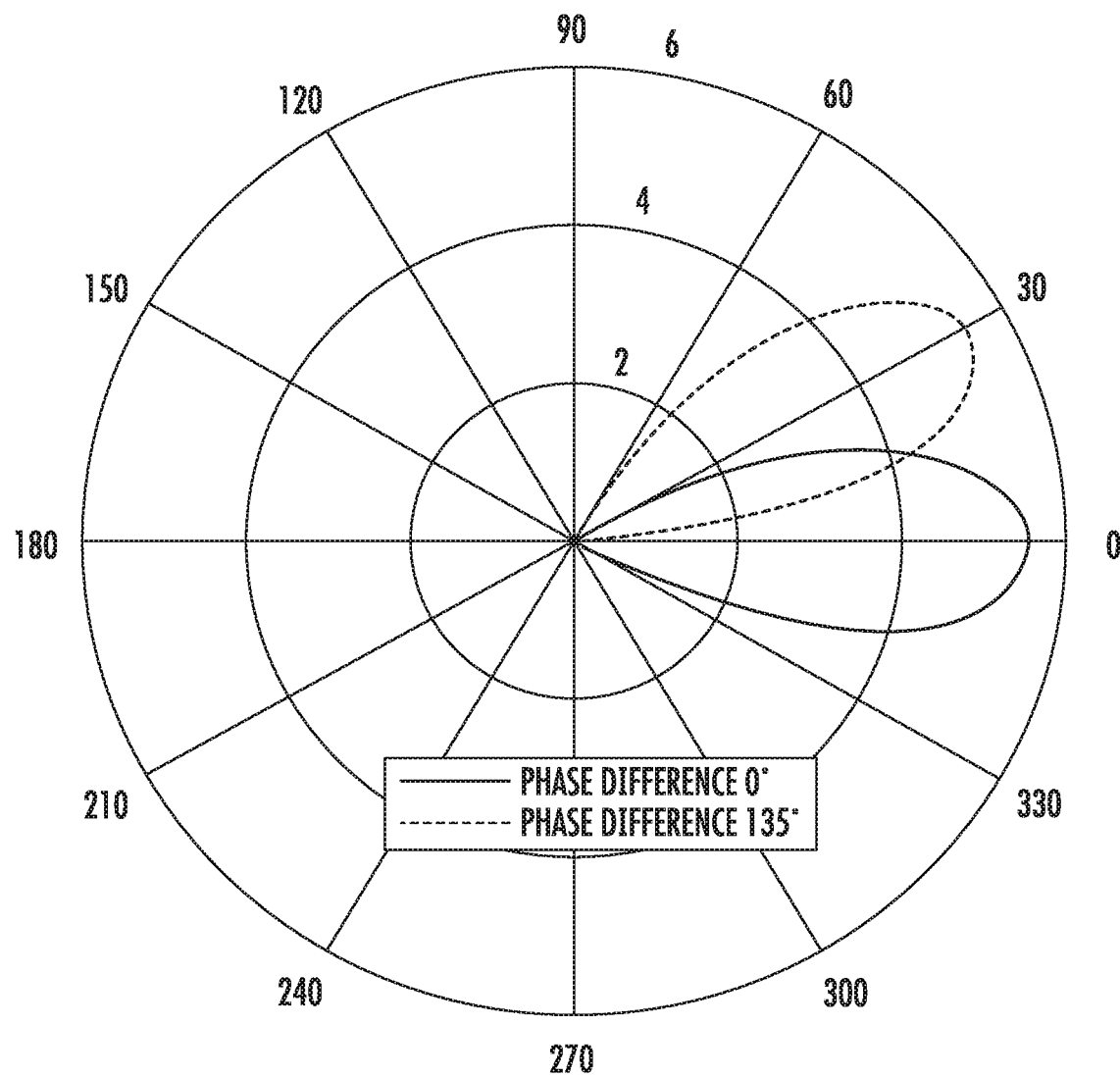
FIG. 2 is an illustration of beam tilt due to phase error.

Before describing in detail example embodiments, it is noted that the embodiments reside primarily in combinations of apparatus components and processing steps related to timing error estimation and compensation for Fifth Generation (5G) New Radio (NR) downlink (DL) systems with uncalibrated antennas. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments are directed to timing error estimation and compensation for Fifth Generation (5G) New Radio (NR) downlink (DL) systems with uncalibrated antennas. According to one aspect, a method in a network node includes transmitting a first Channel State Information Reference Signal (CSI-RS) having a first timing compensation and transmitting a second CSI-RS having a second timing compensation, receiving a CSI-RS resource indicator (CRI) in a CSI report from a wireless device (WD), and determining from the CRI which of the first and second timing compensation results in a greater spectrum efficiency.

Figure 4:
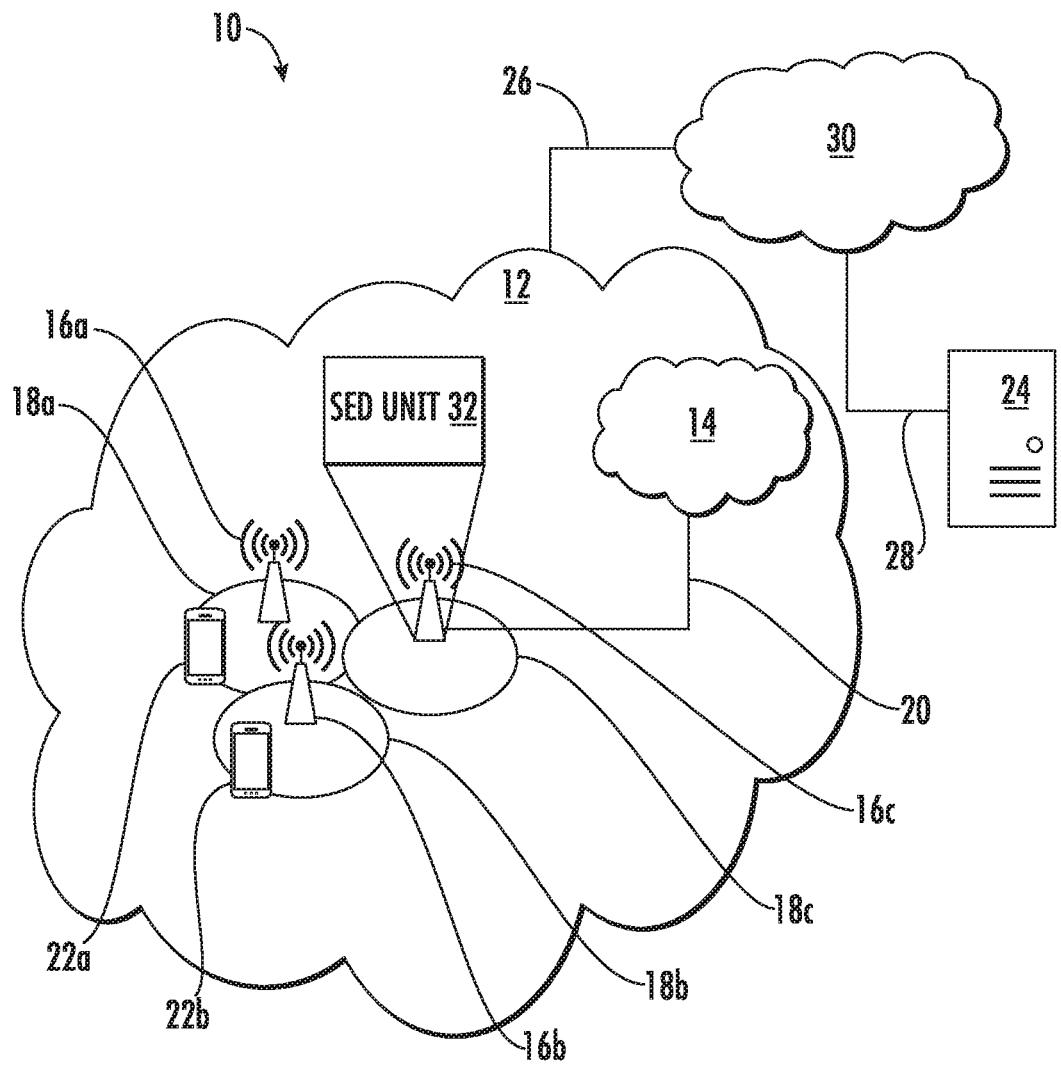
FIG. 4 is a schematic diagram of an example network architecture illustrating a communication system according to principles disclosed herein.

Referring again to the drawing figures, in which like elements are referred to by like reference numerals, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNB s, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 (eNB or gNB) is configured to include a spectrum efficiency determination unit 32 which is configured to determine from the CRI which of the first and second timing compensation results in a greater spectrum efficiency.

Example implementations, in accordance with an embodiment, of the WD 22, network node 16 and host computer 24 discussed in the preceding paragraphs will now be described with reference to FIG. 5.

The communication system 10 includes a network node 16 provided in a communication system 10 and including hardware 38 enabling it to communicate with the WD 22. The hardware 38 may include a radio interface 42 for setting up and maintaining at least a wireless connection 46 with a WD 22 located in a coverage area 18 served by the network node 16. The radio interface 42 may be formed as or may include, for example, one or more RF transmitters, one or more RF receivers, and/or one or more RF transceivers. The radio interface 42 includes an array of antennas 43 to radiate and receive signal carrying electromagnetic waves.

In the embodiment shown, the hardware 38 of the network node 16 further includes processing circuitry 48. The processing circuitry 48 may include a processor 50 and a memory 52. In particular, in addition to or instead of a processor, such as a central processing unit, and memory, the processing circuitry 48 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 50 may be configured to access (e.g., write to and/or read from) the memory 52, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 44 stored internally in, for example, memory 52, or stored in external memory (e.g., database, storage array, network storage device, etc.) accessible by the network node 16 via an external connection. The software 44 may be executable by the processing circuitry 48. The processing circuitry 48 may be configured to control any of the methods and/or processes described herein and/or to cause such methods, and/or processes to be performed, e.g., by network node 16. Processor 50 corresponds to one or more processors 50 for performing network node 16 functions described herein. The memory 52 is configured to store data, programmatic software code and/or other information described herein. In some embodiments, the software 44 may include instructions that, when executed by the processor 50 and/or processing circuitry 48, causes the processor 50 and/or processing circuitry 48 to perform the processes described herein with respect to network node 16. For example, processing circuitry 48 of the network node 16 may include spectrum efficiency determination unit 32 which is configured to determine from the CRI which of the first and second timing compensation results in a greater spectrum efficiency.

The communication system 10 further includes the WD 22 already referred to. The WD 22 may have hardware 60 that may include a radio interface 62 configured to set up and maintain a wireless connection 46 with a network node 16 serving a coverage area 18 in which the WD 22 is currently located. The radio interface 62 may be formed as or may include, for example, one or more RF transmitters, one or more RF receivers, and/or one or more RF transceivers. The radio interface 62 includes an array of antennas 63 to radiate and receive signal carrying electromagnetic waves.

The hardware 60 of the WD 22 further includes processing circuitry 64. The processing circuitry 64 may include a processor 66 and memory 68. In particular, in addition to or instead of a processor, such as a central processing unit, and memory, the processing circuitry 64 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 66 may be configured to access (e.g., write to and/or read from) memory 68, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 70, which is stored in, for example, memory 68 at the WD 22, or stored in external memory (e.g., database, storage array, network storage device, etc.) accessible by the WD 22. The software 70 may be executable by the processing circuitry 64. The software 70 may include a client application 72. The client application 72 may be operable to provide a service to a human or non-human user via the WD 22.

The processing circuitry 64 may be configured to control any of the methods and/or processes described herein and/or to cause such methods, and/or processes to be performed, e.g., by WD 22. The processor 66 corresponds to one or more processors 66 for performing WD 22 functions described herein. The WD 22 includes memory 68 that is configured to store data, programmatic software code and/or other information described herein. In some embodiments, the software 70 and/or the client application 72 may include instructions that, when executed by the processor 66 and/or processing circuitry 64, causes the processor 66 and/or processing circuitry 64 to perform the processes described herein with respect to WD 22.

Figure 3:
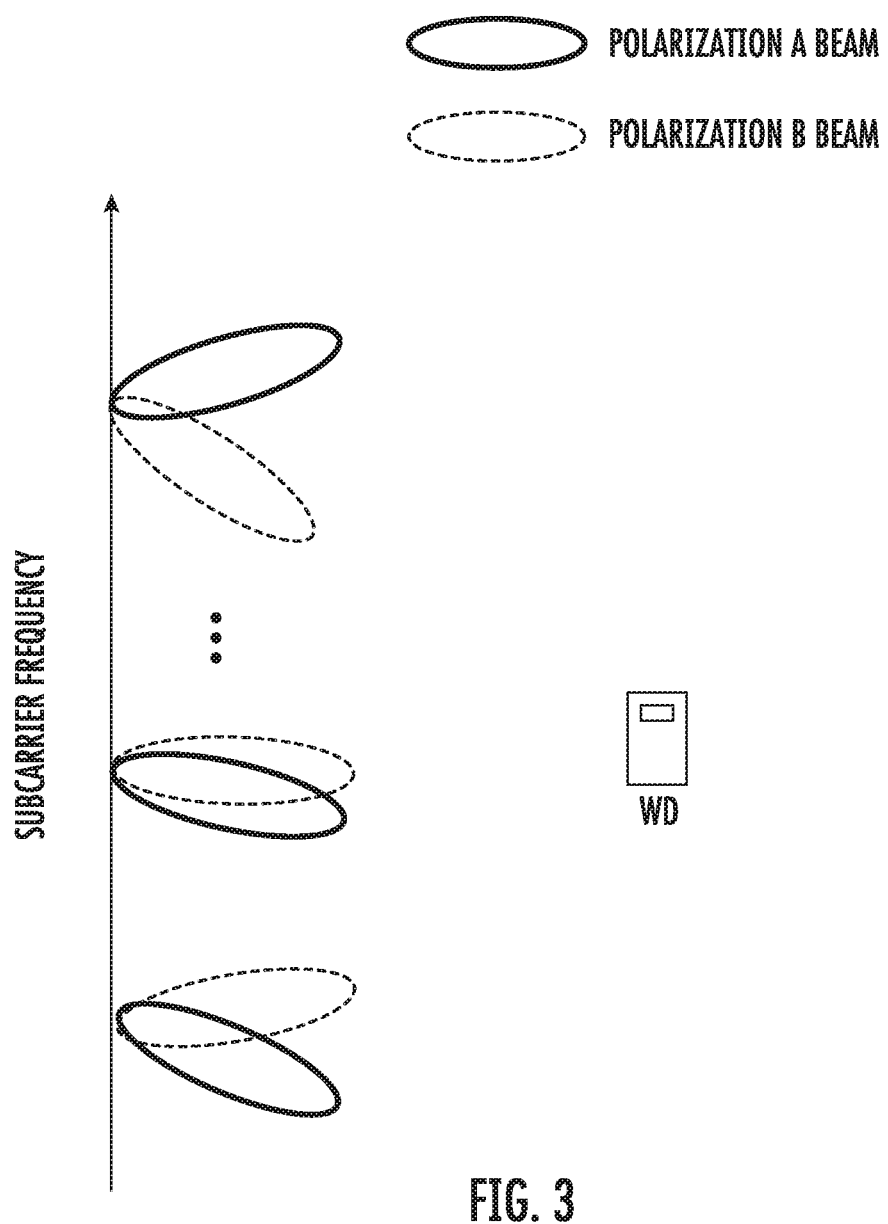
FIG. 3 is another illustration of beam tilt.

In some embodiments, the inner workings of the network node 16 and WD 22 may be as shown in FIG. 3 and independently, the surrounding network topology may be that of FIG. 4.

The wireless connection 46 between the WD 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Figure 5:
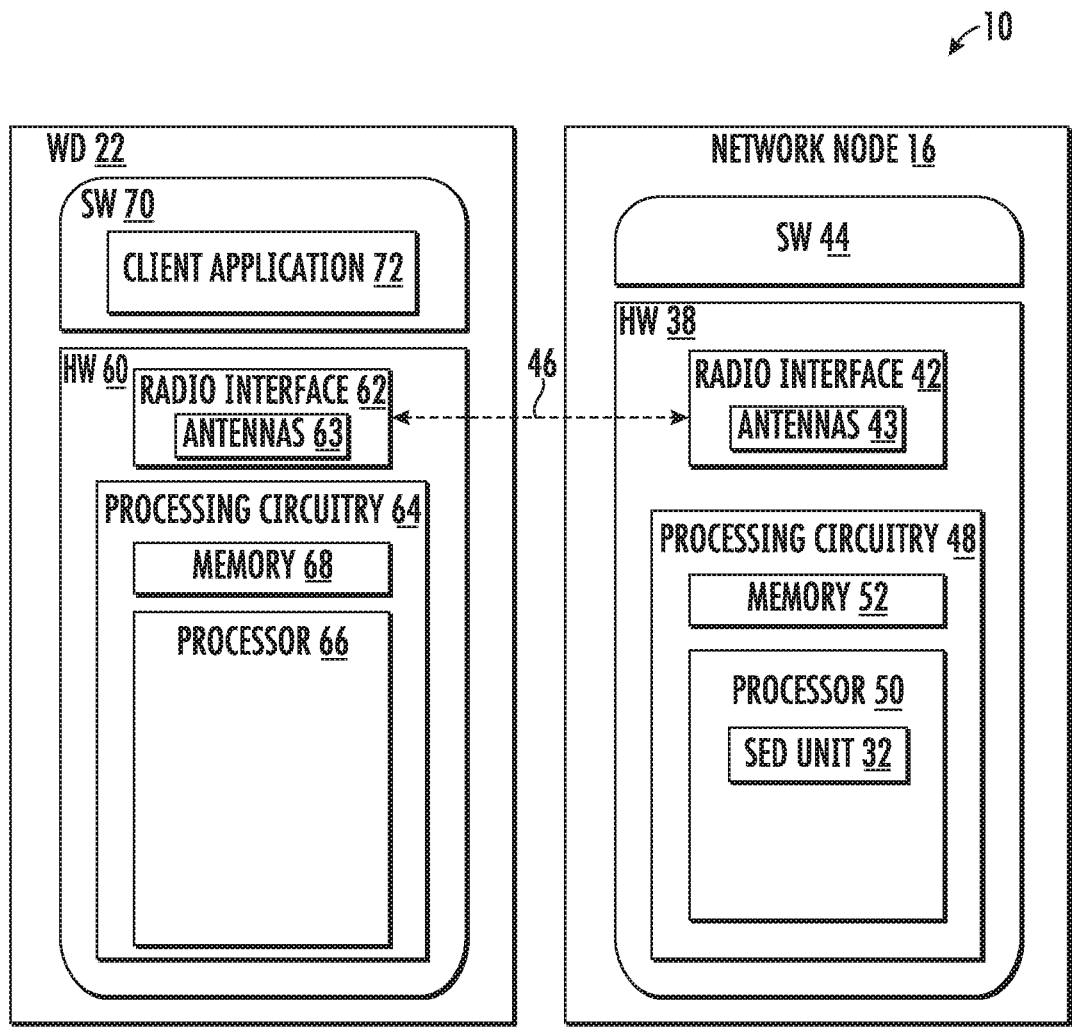
FIG. 5 is a block diagram of a network node in communication with a wireless device over a wireless connection according to some embodiments of the present disclosure.

Although FIGS. 4 and 5 show various "units" such as spectrum efficiency determination unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 6:
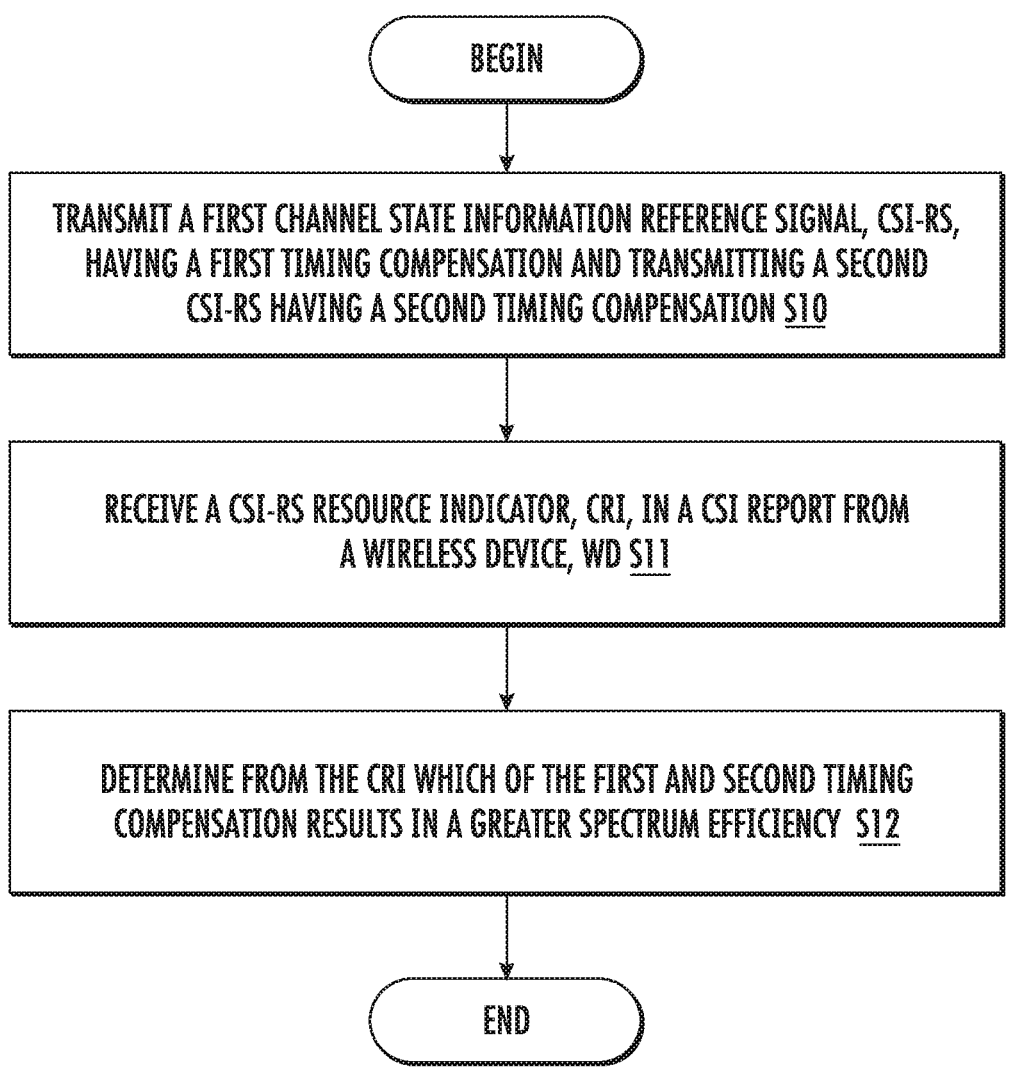
FIG. 6 is a flowchart of an example process in a network node for timing error estimation and compensation for Fifth Generation (5G) New Radio (NR) downlink (DL) systems with uncalibrated antennas.

FIG. 6 is a flowchart of an example process in a network node 16 for timing error estimation and compensation for Fifth Generation (5G) New Radio (NR) downlink (DL) systems with uncalibrated antennas. One or more blocks described herein may be performed by one or more elements of network node 16 such as by one or more of processing circuitry 48 (including the spectrum efficiency determination unit 32), processor 50, and/or radio interface 42. Network node 16 such as via processing circuitry 48 and/or processor 50 and/or radio interface 42 is configured to transmit a first Channel State Information Reference Signal, CSI-RS, having a first timing compensation and transmitting a second CSI-RS having a second timing compensation (Block S10). The process also includes receiving a CSI-RS resource indicator, CRI, in a CSI report from a WD (Block S11). The process further includes determining from the CRI which of the first and second timing compensation results in a greater spectrum efficiency (Block S12).

Having described the general process flow of arrangements of the disclosure and having provided examples of hardware and software arrangements for implementing the processes and functions of the disclosure, the sections below provide details and examples of arrangements for timing error estimation and compensation for Fifth Generation (5G) New Radio (NR) downlink (DL) systems with uncalibrated antennas.

The NR type 1 codebook specified in the 3GPP NR standard is based on a set of pre-defined precoding matrices. The precoding matrix, denoted as W, can be described as a two-stage precoding structure as follows:

$$W = W_1 W_2.$$

The first stage of the precoding structure, i.e., $W_1$, may be described as a codebook for beam direction and is defined as wideband. The first stage consists of a group of 2-dimensional (2D) grid-of-beams (GoB), which may be characterized as $$W_1 = \begin{bmatrix} w_h \otimes w_v & 0 \\ 0 & w_h \otimes w_v \end{bmatrix}$$

where $w_h$ and $w_v$ are precoding vectors selected from an over-sampled discrete Fourier transform (DFT) for the horizontal direction and the vertical direction, respectively, and may be expressed by:

$$w_v = \frac{1}{\sqrt{M}} \left[ 1, e^{\frac{j2\pi v}{MO_1}}, \ldots, e^{\frac{j2\pi m v}{MO_1}}, \ldots, e^{\frac{j2\pi (M-1) v}{MO_1}} \right]^T,$$

$$w_h = \frac{1}{\sqrt{N}} \left[ 1, e^{\frac{j2\pi h}{NO_2}}, \ldots, e^{\frac{j2\pi n v}{NO_2}}, \ldots, e^{\frac{j2\pi (N-1) h}{NO_2}} \right]^T,$$

where $O_1$ and $O_2$ are the over-sampling rate in the vertical and horizontal directions, respectively.

The second stage of the precoding matrix, i.e., $W_2$, is used for co-phasing between two polarizations. The co-phasing vector for a one-layer case may be defined as:

$$W_2(n) = \begin{bmatrix} 1 \\ \varphi_n \end{bmatrix}, \varphi_n = e^{j\frac{\pi n}{2}}, n = 0, 1, 2, 3$$

The precoder matrix for one-layer transmission may be created by appending columns of one-layer precoder vectors defined as:

$$W(l, n) = W_1(l)W_2(n) = \begin{bmatrix} w_h(l) & 0 \\ 0 & w_h(l) \end{bmatrix} \begin{bmatrix} 1 \\ \varphi_n \end{bmatrix}.$$

The precoder matrix for multi-layer transmission may be created by appending columns of one-layer precoder vectors as:

=[W(l$_0$, n$_0$) W(l$_1$, n$_1$) ... W(l$_{L-1}$, n$_{L-1}$)]

where L is the number of layers.

As co-phasing vector will not change the phase difference between co-polarized antennas. The beam direction may be determined by W$_1$. The NR type I codebook assumes that the beams of two polarizations point to the same direction over the whole cell bandwidth. As timing errors of antennas will result in frequency dependent beam direction and misalignment of two beams, the antenna timing error has to be compensated to achieve desired system performance.

Timing Error Measurement by CRI Aided Direct Search

Figure 7:
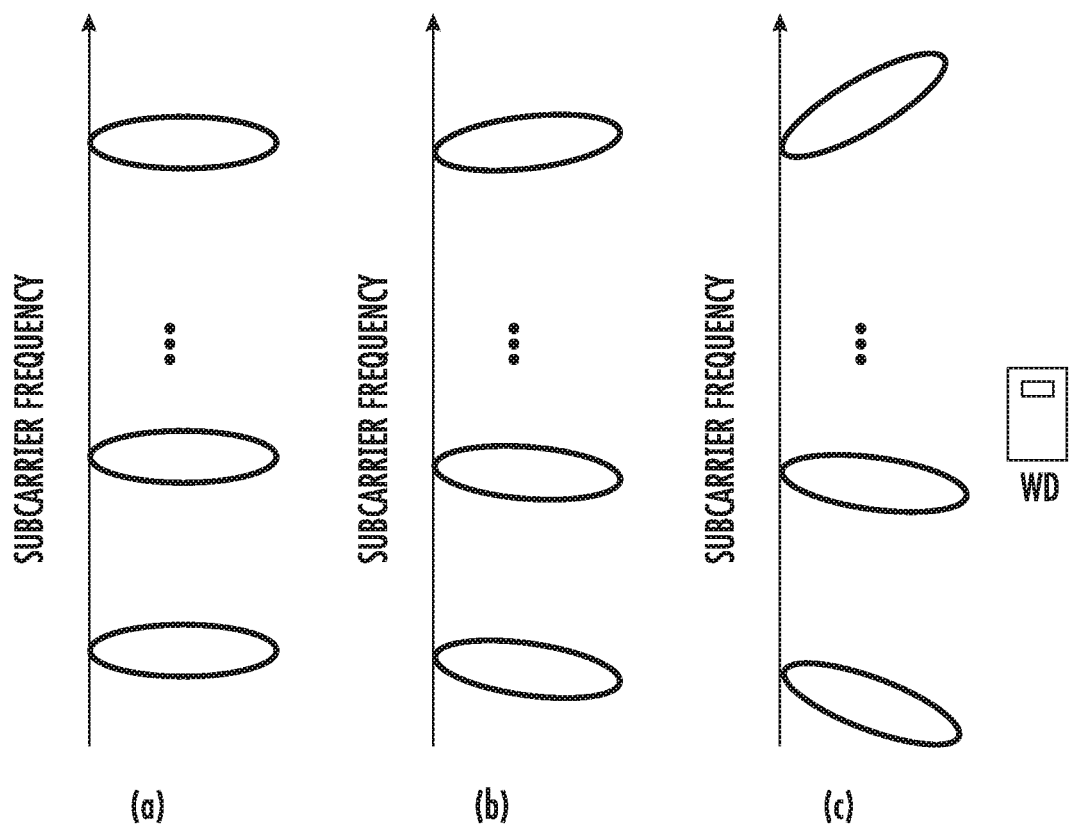
FIG. 7 illustrates the frequency dependent beam direction caused by zero, small and large timing errors.

Returning again to the drawing figures, FIG. 7 illustrates the frequency dependent beam direction caused by zero, small and large timing errors.

As stated previously, the NR codebook of co-polarized antennas W$_1$ is designed as wideband. W$_1$ will compensate frequency dependent phase errors with a compromised value which results in spectrum efficiency loss: the larger the delay error the greater the loss.

Figure 8:
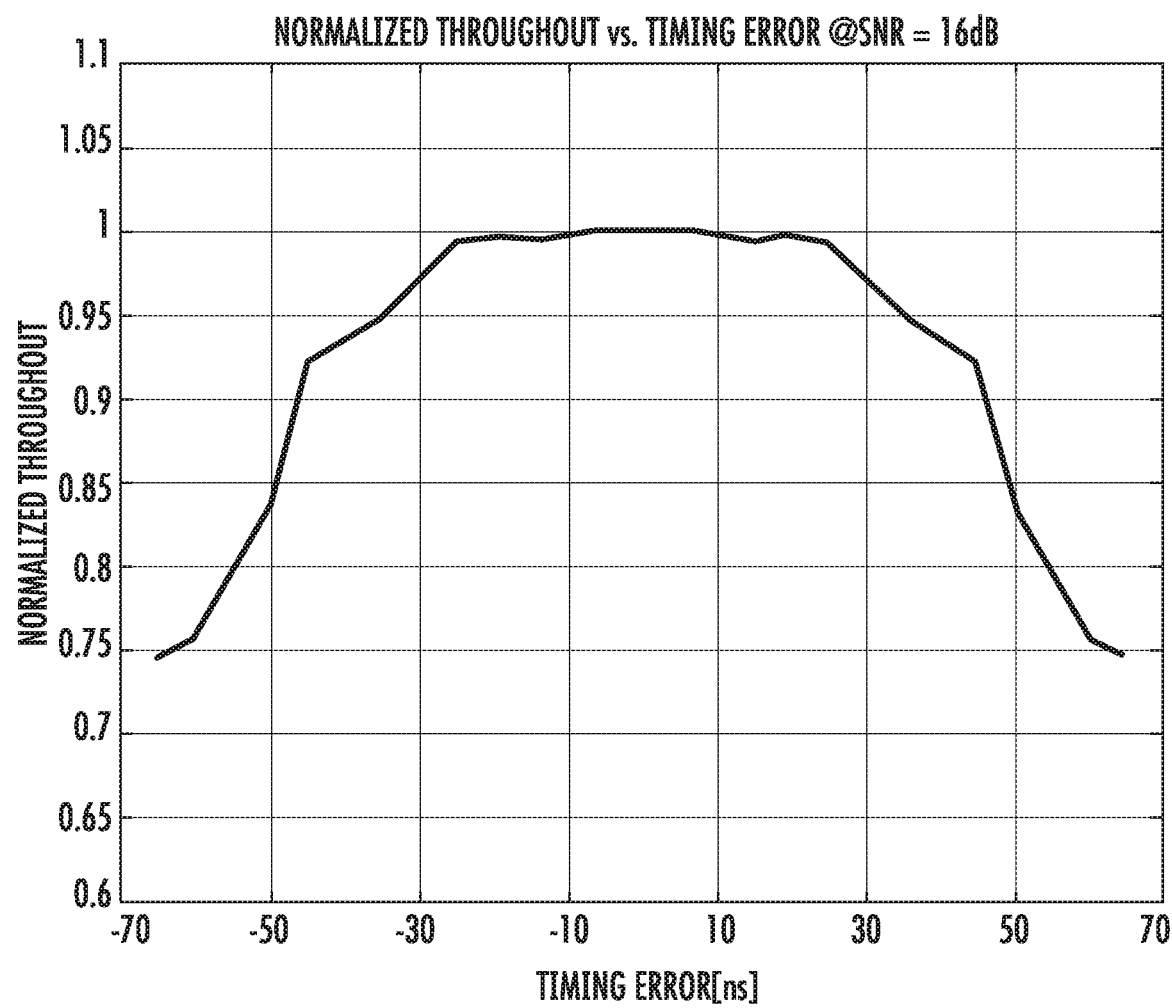
FIG. 8 is a graph of normalized throughput as a function of timing error.

The spectrum efficiency can be seen as a function of timing error f($\Delta t_X$), X∈{A, B}. When the CSI report bandwidth and timing error are within a specific range such $|2\pi f\Delta t_X|<2\pi$, f($\Delta t_X$) is a unimodal function. The single maximum value of f($\Delta t_X$) occurs at $\Delta t_x$ equals zero. FIG. 8 illustrates this relationship with normalized WD 22 throughput at a given signal-to-noise ratio (SNR) vs timing error.

It is observed that the timing error $\Delta t_X$ is quite stable over time in practical antenna systems. As f($\Delta t_X$) is unimodal with a single maximum value, when 2-port CSI-RS resources to two antennas of one polarization is mapped, e.g., polarization A, and a timing compensation u is injected into the CSI-RS signal, the spectrum efficiency will become f($\Delta t_X$− u). If the timing compensation u is varied from minimum timing error e$_{min}$ to maximum timing error e$_{max}$, and spectrum efficiency is measured, then u$_{opt}$=−$\Delta t_X$, which gives the maximum f($\Delta t_X$−u)=f(0).

Some embodiments of the antenna timing calibration for each polarization include methods performed separately and independently for each co-polarized antenna pair. However, antenna timing calibration for each polarization may be performed for dependent co-polarized antenna pairs.

CSI-RS Resource Configuration and CSI Report Configuration

Figure 9:
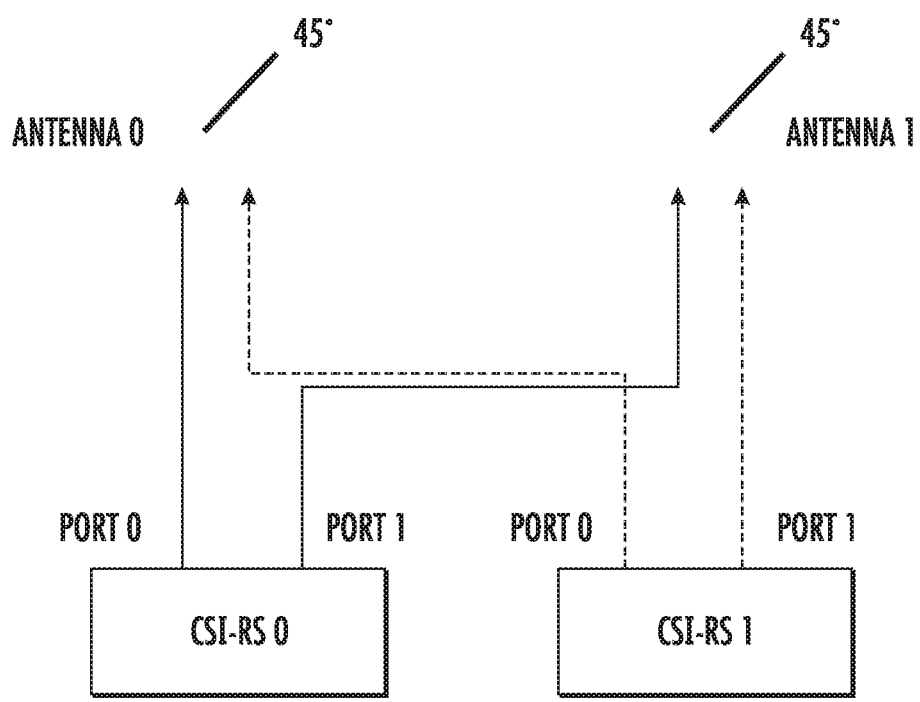
FIG. 9 illustrates port mapping for a first polarization.

In one embodiment, a dedicated CSI-RS resource set with two 2-port non-zero power (NZP) CSI-RS resources is used for the search of timing errors for any given polarization. The two ports of both CSI-RS resources are mapped to two co-polarized antennas, e.g., antennas with polarization A, as shown in FIG. 9.

The CSI-RS signal is transmitted with periodicity T. For each transmission occurrence m, two different tentative timing compensations, e.g., u$_0$(m) and u$_1$(m), are injected to CSI-RS resource 0 and CSI-RS resource 1 respectively. The determination of u$_0$(m) and u$_1$(m) is described below.

UE is configured to send a CSI report for each CSI-RS

In order to avoid the ambiguity of the CSI-report and the timing injected to CSI-RS signal, a one-to-one mapping between CSI report and CSI-RS transmission is required. In order to achieve this one-to-one mapping, the following additional configurations may be implemented:

1. In order to prevent the WD 22 from performing the averaging of the channel across multiple timing delayed CSI-RS signals, timeRestrictionForChannel Measurements is configured in CSI-ReportConfig. Based on 3GPP Technical Standard (TS38.214), if a WD 22 is configured with higher layer parameter time RestrictionForChannelMeasurements in CSI-ReportConfig, the WD 22 may derive the channel measurements for computing CSI reported in uplink slot n based only on the most recent occasion, and not later than the CSI reference resource, of NZP CSI-RS associated with the CSI resource setting without any averaging of past channel estimates.

2. To get the one-to-one mapped feedback, the CSI report may be synchronized with the CSI-RS resource transmission. As described in 1), if a WD 22 is configured with higher layer parameter timeRestrictionForChannelMeasurements in CSI-ReportConfig, the WD 22 may derive the channel measurements for computing CSI reported in uplink slot n based on only the most recent occasion, and (no later than the CSI reference resource), of NZP CSI-RS associated with the CSI resource setting. According to the CSI reference resource definition, in the time domain, the CSI reference resource for a CSI reporting in uplink slot n is defined by a single downlink slot n-n$_{CSI\_ref}$. For periodic and semi-persistent CSI reporting, if a single CSI-RS resource is configured for channel measurement, n$_{CSI\_ref}$ is the smallest value greater than or equal to 4 slots, such that it corresponds to a valid downlink slot. Based on this condition, for periodic and semi-persistent CSI reporting, the gap or CSI-RS signal transmission period T between the report and the CSI-RS transmission may be larger than 4, i.e., if T≥4, each CSI report can be associated with a specific CSI-RS reference signal.

Timing Error Measurement

Figure 10:
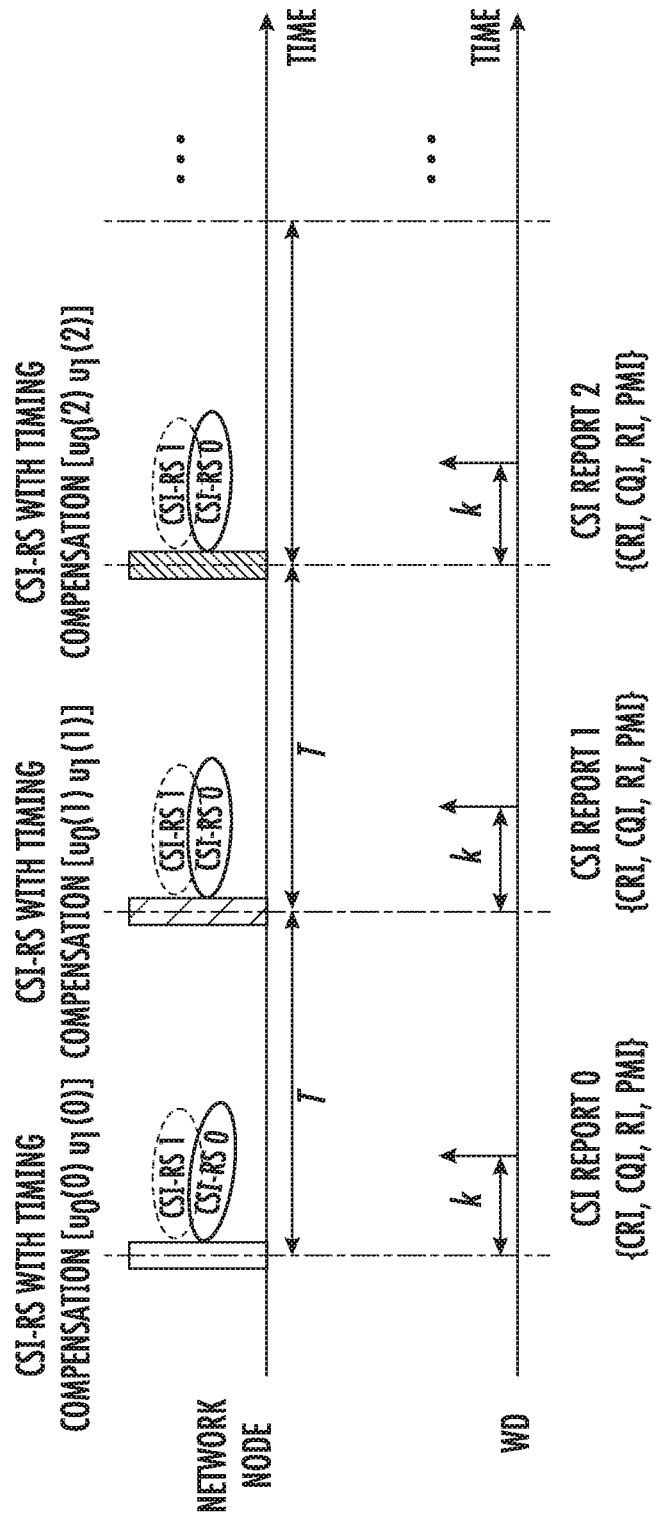
FIG. 10 illustrates successive timing compensation according to principles disclosed herein.

For each set of CSI-RS signal transmissions, a WD 22 should be able to perceive the spectrum efficiencies of the system with these two compensations, i.e., f($\Delta t_X$−u$_0$(m)) and f($\Delta t_X$−u$_1$(m)), and may notify the network node 16 with a CRI in the CSI report indicating the CSI-RS resource with higher spectrum efficiency. Based on the WD 22 reported CRI, the network node 16 understands which timing compensation as between u$_0$(m) and u$_1$(m) is better and may determine the next set of timing compensations that might further improve spectrum efficiency. See FIG. 10.

Figure 11:
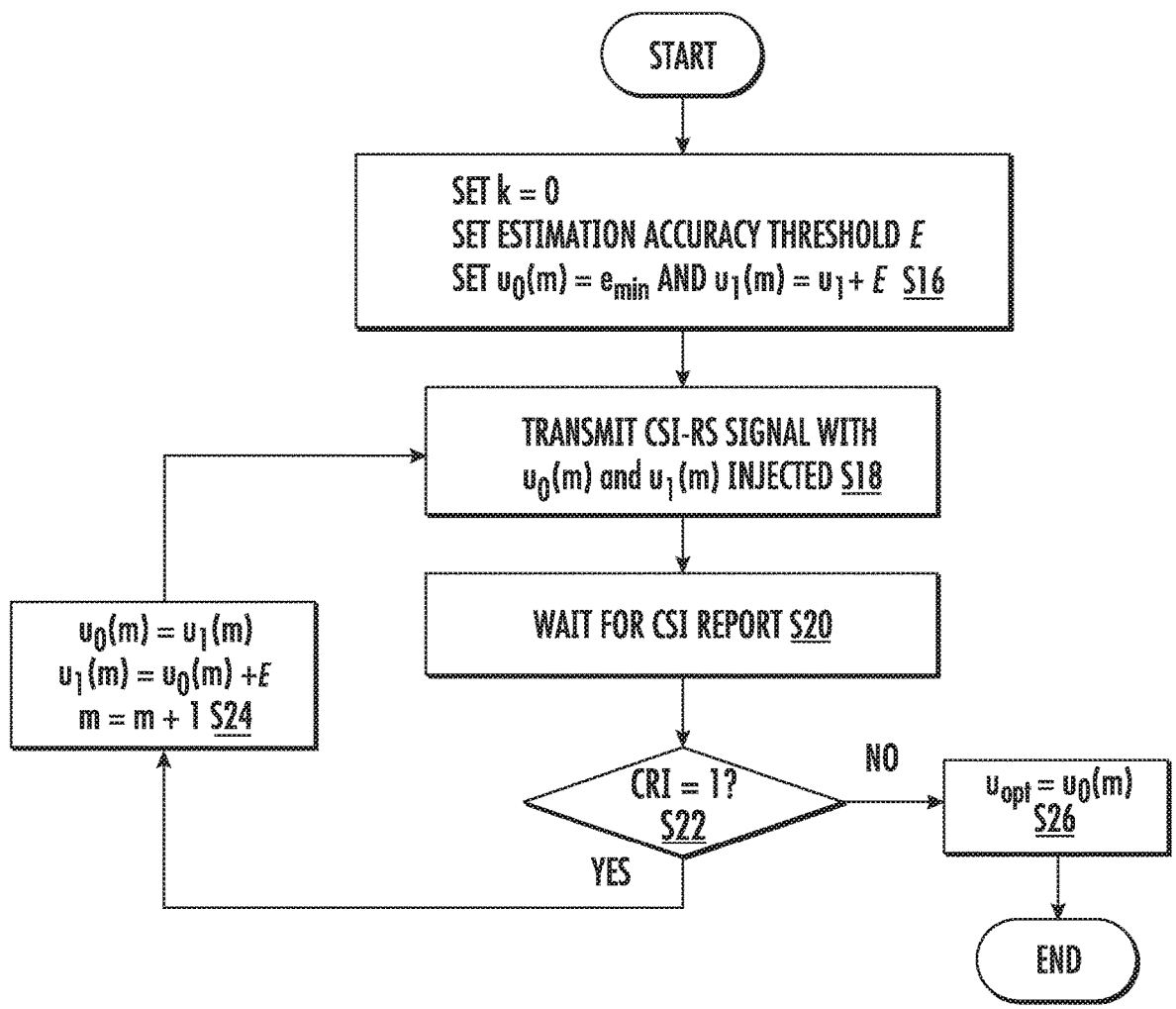
FIG. 11 is a flowchart of an example linear search algorithm to find a timing compensation to improve spectrum efficiency according to principles disclosed herein.

A simple search algorithm that can be performed by the processing circuitry 48 is the linear search as illustrated by flow chart in FIG. 11. First, values are initialized (Block S16). Then a CSI-RS is transmitted with u$_0$(m) and u$_1$(m) injected (Block S18). The network node 16 waits for a CSI report from the wireless device 22 (Block S20). When the CSI report is received, the network node 16, via processing circuitry 48, determines if the CRI reported in the CSI report is equal to 1 (Block S22). If so, the values of u$_0$(m) and u$_1$(m) are updated (Block S24) and the process continues at Block S18. Otherwise, u$_{opt}$=u$_0$(m) (Block S26), and the process ends.

Figure 12:
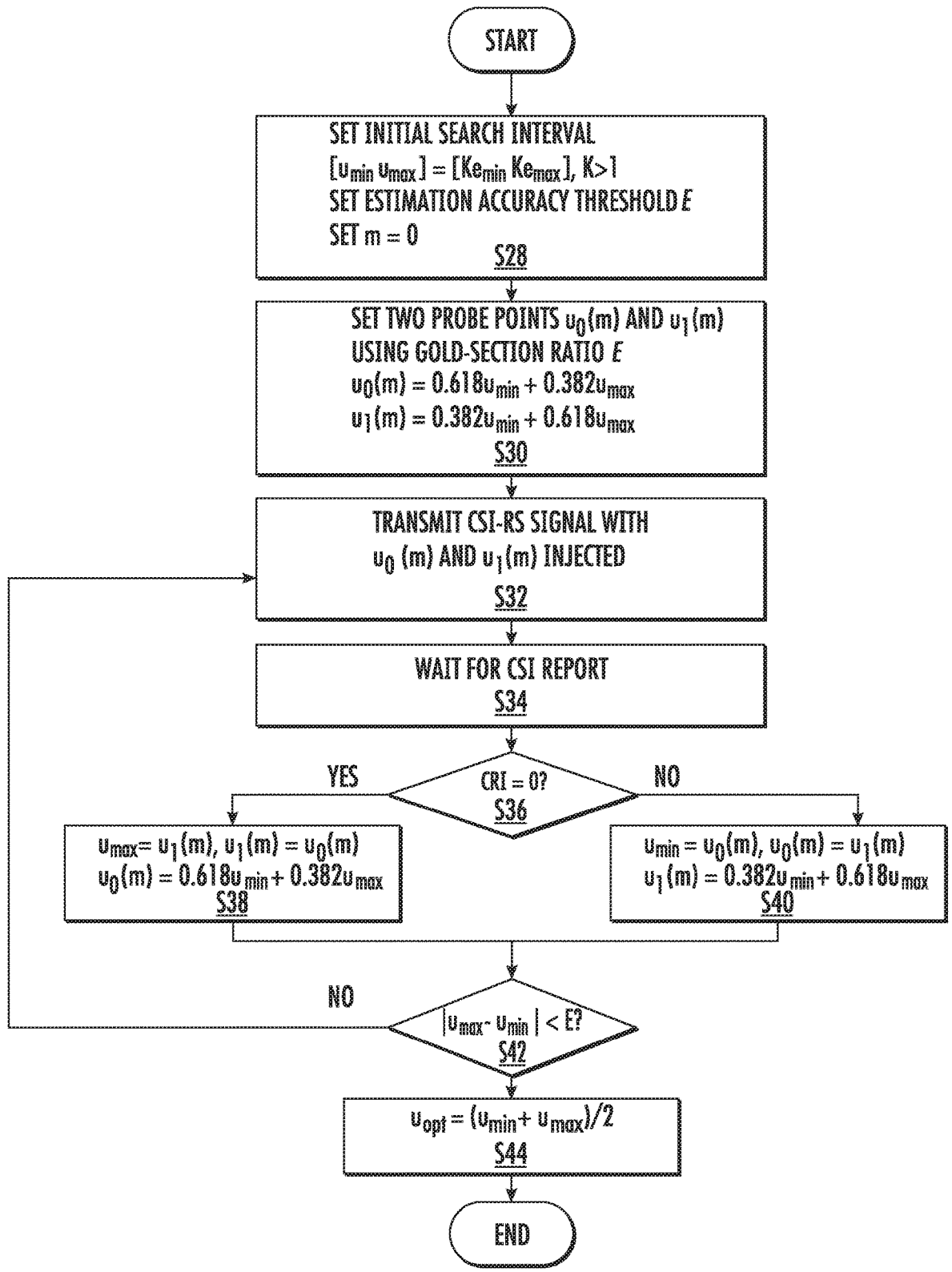
FIG. 12 is a flowchart of an example of a Golden-Section search algorithm to find a timing compensation to improve spectrum efficiency according to principles disclosed herein.

In some embodiments, a more computational efficient search method that can be performed by the processing circuitry 48 such as the Golden-Section Search method illustrated by the flow chart in FIG. 12 may also be used. The process begins by initializing a search interval and an estimation accuracy threshold E (Block S28). Then, two probe points $u_0(m)$ and $u_1(m)$ are set using a Golden-Section ratio (Block S30). Then a CSI-RS is transmitted with $u_0(m)$ and $u_1(m)$ injected (Block S32). The network node 16 waits for a CSI report from the wireless device 22 (Block S34). When the CSI report is received, the network node 16, via processing circuitry 48, determines if the CRI reported in the CSI report is equal to 0 (Block S36). If so, the values of $u_0(m)$ and $u_1(m)$ are updated (Block S38) according to a first weighted sum. Otherwise, $u_0(m)$ and $u_1(m)$ are updated (Block S40) according to a second weighted sum. Then, the processing circuitry 48 compares a difference between the minimum and maximum timing compensation values to a threshold (Block S42). If the difference is greater than the threshold, the process continues at Block S32, where another CSI-RS is sent with the updated value of $u_0(m)$ and $u_1(m)$. Otherwise, $u_{opt}$ is set equal to the midpoint between the minimum and maximum timing compensation values (Block S44), and the process ends.

Other methods for one-dimensional maximum search problem can also be used to solve this problem.

Timing Error Compensation

Once a timing error search process terminates, the measured timing error can be compensated in software and/or hardware of the network node 16. The timing error measurement and compensation can be performed periodically with a periodicity of $T_{AC}$.

The 1st timing error measured may be the whole timing error. After the 1st timing error compensation, the timing error measured may be the subsequent timing error search process residual error. Hence, the timing compensation is incremental, i.e., $$u(-1)=0,$$

$$u(n)=u(n-1)+u_{opt}(n), \text{ for } n \geq 0$$

Figure 13:
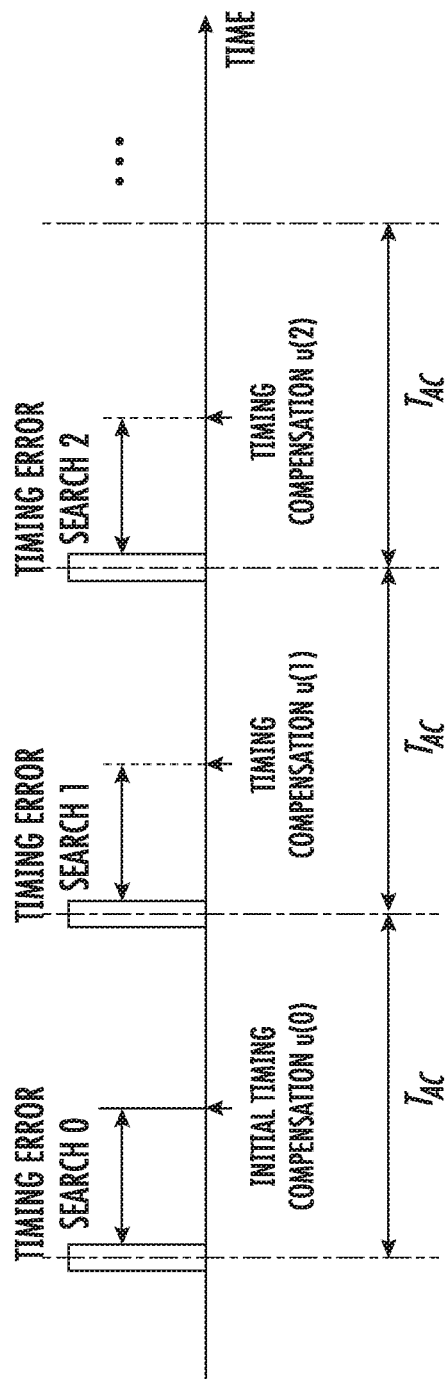
FIG. 13 illustrates a timing error and compensation process according to principles set forth herein.

The timing error measurement and compensation process is illustrated in FIG. 13.

Extension to Large Two-Dimensional Antenna Array

Figure 14:
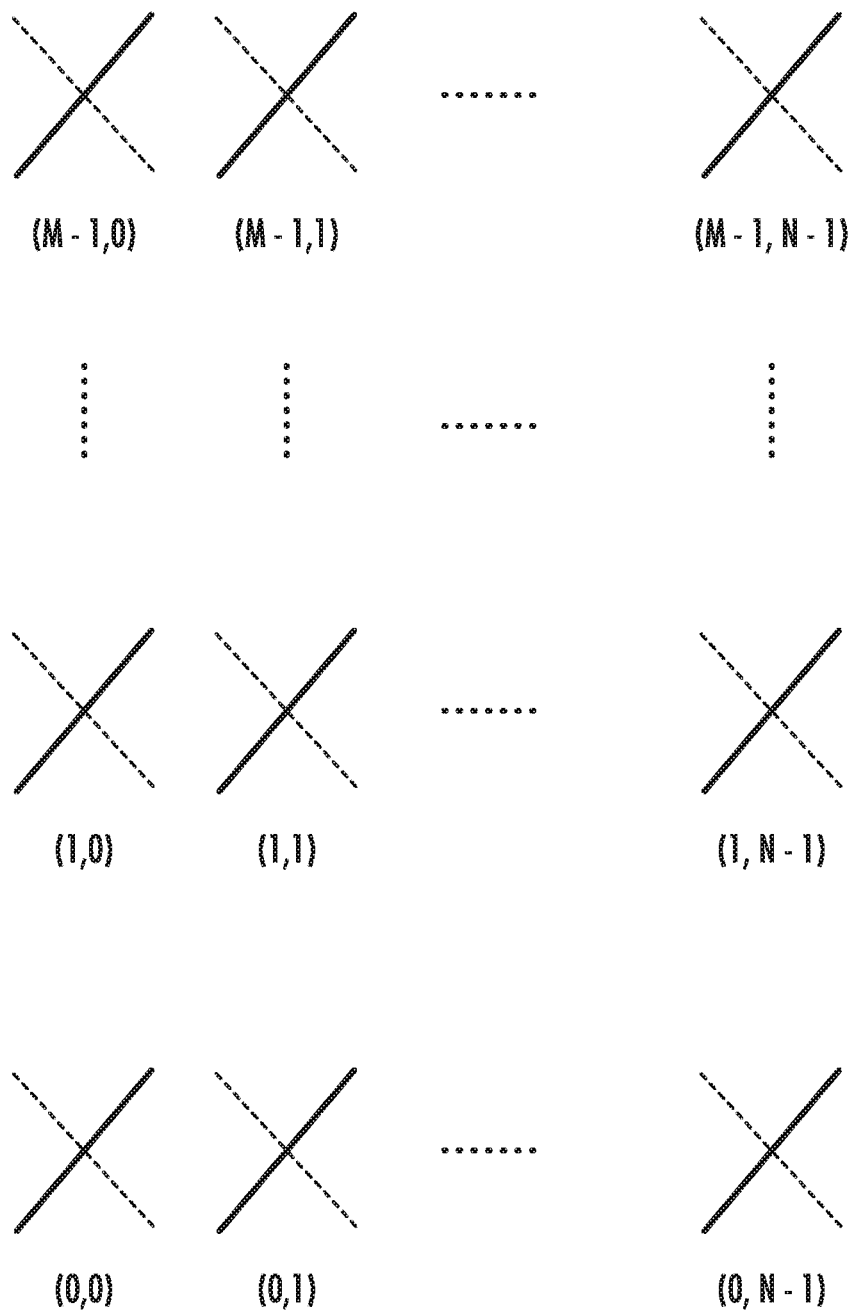
FIG. 14 illustrates a two-dimensional antenna array.

The method disclosed above may be applied to a two-dimensional antenna array. A typical massive MIMO system consists of two-dimensional antenna element array with M rows, N columns and K polarizations (K=2 in the case of cross-polarization) as shown in FIG. 14.

Figure 15:
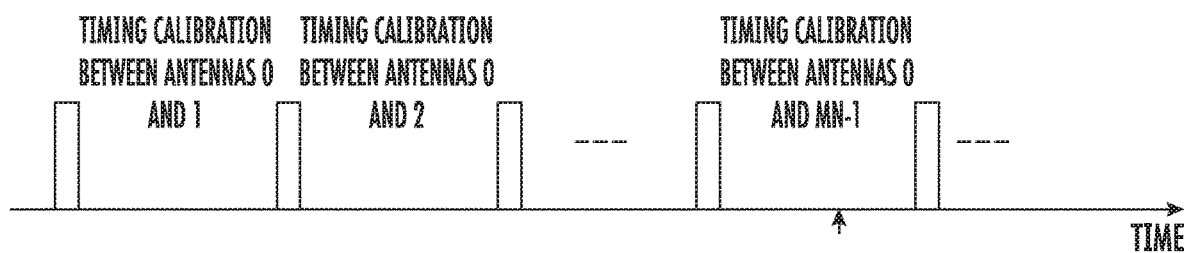
FIG. 15 illustrates successively performing timing calibration of the antennas of a two-dimensional array for a first polarization.

The number of antennas for each polarization is MN. The methods disclosed above may be executed iteratively to all antennas in the same polarization. One of the antennas in a polarization can be used as a reference, e.g., the antenna 0 for polarization A. The timing error between antennas 0 and 1 can be first calibrated, then the timing error between antennas 0 and 2 can be calibrated, and so on, until the timing calibration between antennas 0 and the last antenna in the first polarization MN−1 has been finished, as illustrated in FIG. 15.

Once the timing calibration of antennas in the first polarization is completed, the second polarization can then be calibrated. Similarly, the timing calibration of the second polarization can use one of the antennas in that polarization as a reference, e.g., the first antenna in that polarization, antenna MN. The timing error between antennas MN and MN+1 can be calibrated, then the timing error between antennas MN and MN+2, can be calibrated, and so on.

According to one aspect, a method in a network node 16 for timing compensation of a co-polarized antenna pair is provided. The method includes transmitting a first Channel State Information Reference Signal, CSI-RS, having a first timing compensation and transmitting a second CSI-RS having a second timing compensation. The method also includes receiving a CSI-RS resource indicator, CRI, in a CSI report from a wireless device, WD 22. The method further includes determining from the CRI which of the first and second timing compensation results in a greater spectrum efficiency.

According to this aspect, in some embodiments, the method further includes iteratively performing the transmitting, receiving and determining until a timing compensation that results in a maximum spectrum efficiency at the WD 22 is determined. In some embodiments, the timing compensation that results in the maximum spectrum efficiency is determined according to a linear search algorithm. In some embodiments, the timing compensation that results in the maximum spectrum efficiency is determined according to a non-linear search algorithm. In some embodiments, the timing compensation that results in a maximum spectrum efficiency is determined periodically. In some embodiments, determining a timing compensation that results in a maximum spectrum efficiency is performed for a first polarization of a set of co-polarized antenna pairs, followed by determining a timing compensation that results in a maximum spectrum efficiency for a second polarization of the set of co-polarized antenna pairs. In some embodiments, for each polarization, one antenna is used as a reference antenna and a timing compensation is determined for each antenna of a polarization relative to the reference antenna. In some embodiments, the first and second timing compensation are incremental after a first iteration. In some embodiments, the method further includes transmitting an information element restricting a time for which the WD 22 makes a measurement of a channel between the network node 16 and the WD 22 to prevent the WD 22 from measuring the channel across multiple sequentially transmitted CSI-RS. In some embodiments, the method further includes configuring the WD 22 to make a channel measurement for reporting in an uplink timeslot based on a most recent occasion of a CSI-RS received by the WD 22.

According to another aspect, a network node 16 is configured for timing compensation of a co-polarized antenna pair. The network node 16 includes a radio interface 42 configured to: transmit a first Channel State Information Reference Signal, CSI-RS, having a first timing compensation and transmitting a second CSI-RS having a second timing compensation; and receive a CSI-RS resource indicator, CRI, in a CSI report from a wireless device, WD 22. The network node 16 also includes processing circuitry 48 in communication with the radio interface. The processing circuitry is configured to determine from the CRI which of the first and second timing compensation results in a greater spectrum efficiency.

According to this aspect, in some embodiments, the processing circuitry 48 and the radio interface 42 are configured to iteratively perform the transmitting, receiving and determining until a timing compensation that results in a maximum spectrum efficiency at the WD 22 is determined. In some embodiments, the timing compensation that results in the maximum spectrum efficiency is determined according to a linear search algorithm. In some embodiments, the timing compensation that results in the maximum spectrum efficiency is determined according to a non-linear search algorithm. In some embodiments, the timing compensation that results in a maximum spectrum efficiency is determined periodically. In some embodiments, the network node 16 further includes a set of co-polarized antenna pairs in communication with the radio interface 42, and wherein determining a timing compensation that results in a maximum spectrum efficiency is performed for a first polarization of the set of co-polarized antenna pairs, followed by determining a timing compensation that results in a maximum spectrum efficiency for a second polarization of the set of co-polarized antenna pairs. In some embodiments, one antenna is used as a reference antenna and a timing compensation is determined for each antenna of a polarization relative to the reference antenna. In some embodiments, the first and second timing compensation are incremental after a first iteration. In some embodiments, wherein the processing circuitry 48 and the radio interface 42 are configured to transmit an information element restricting a time for which the WD 22 makes a measurement of a channel between the network node 16 and the WD 22 to prevent the WD 22 from measuring the channel across multiple sequentially transmitted CSI-RS. In some embodiments, the network node 16 is further configured to configure the WD 22 to make a channel measurement for reporting in an uplink timeslot based on a most recent occasion of a CSI-RS received by the WD 22.

Some embodiments may include one or more of the following:

Group A Embodiments

1. A method for antenna timing calibration for a co-polarized antenna pair, the method including:
   iteratively determining, from a signal, a timing compensation having the highest spectrum efficiency.
2. The method of embodiment 1, wherein the step of iteratively determining comprises the steps of:
   iteratively determining a timing error measurement having the highest spectrum efficiency; and
   compensating the timing error measurement having the highest spectrum efficiency.
3. The method of embodiment 2, wherein the determining of each of the timing error measurements is performed without consideration of any previous signal.
4. The method of any of the embodiments 2 to 3, wherein the step of iteratively determining a timing error measurement comprises the steps of:
   calculating, from the signal, a first timing error measurement having a first spectrum efficiency;
   calculating, from the signal, a second timing error measurement having a second spectrum efficiency;
   based on the CRI report sent back by UE, determining which of the first spectrum efficiency and the second spectrum efficiency has a higher spectrum efficiency; and
   repeating the above steps, based on the timing error measurement having the higher spectrum efficiency and an additional tentative timing error measurement having an additional spectrum efficiency, until the timing error measurement having the highest spectrum efficiency is determined.
5. The method of any of the embodiments 2 to 3, wherein the step of iteratively determining a timing error measurement comprises the steps of performing a golden-section search to determine the timing error measurement having the highest spectrum efficiency.
6. The method of any of the embodiments 1 to 5, wherein the method is applied to a plurality of co-polarized antenna pairs.

Group B Embodiments

7. A method performed by a base station for antenna timing calibration for a co-polarized antenna pair, the method comprising:
   iteratively determining, from a signal, a timing compensation having the highest spectrum efficiency.
8. The method of embodiment 7, wherein the step of iteratively determining comprises the steps of:
   iteratively determining a timing error measurement having the highest spectrum efficiency; and
   compensating the timing error measurement having the highest spectrum efficiency.
9. The method of embodiment 8, wherein the determining of each of the timing error measurements is performed without consideration of any previous signal.
10. The method of any of the embodiments 8 to 9, wherein the step of iteratively determining a timing error measurement comprises the steps of:
    calculating, from the signal, a first timing error measurement having a first spectrum efficiency;
    calculating, from the signal, a second timing error measurement having a second spectrum efficiency;
    based on the CRI report sent back by UE, determining which of the first spectrum efficiency and the second spectrum efficiency has a higher spectrum efficiency; and
    repeating the above steps, based on the timing error measurement having the higher spectrum efficiency and an additional tentative timing error measurement having an additional spectrum efficiency, until the timing error measurement having the highest spectrum efficiency is determined.
11. The method of any of the embodiments 8 to 9, wherein the step of iteratively determining a timing error measurement comprises the steps of performing a golden-section search to determine the timing error measurement having the highest spectrum efficiency.
12. The method of any of the embodiments 7 to 11, wherein the method is applied to a plurality of co-polarized antenna pairs.

Group C Embodiments

13. A wireless device for antenna timing calibration for a co-polarized antenna pair, the wireless device comprising:
    processing circuitry configured to perform any of the steps of any of the Group A embodiments; and
    power supply circuitry configured to supply power to the wireless device.
14. A base station for antenna timing calibration for a co-polarized antenna pair, the base station comprising:
    processing circuitry configured to perform any of the steps of any of the Group B embodiments;
    power supply circuitry configured to supply power to the base station.
15. A user equipment (UE) for antenna timing calibration for a co-polarized antenna pair, the UE comprising:
    one or more antenna(s) configured to send and receive wireless signals;
    radio front-end circuitry connected to the antenna and to processing circuitry, and configured to condition signals communicated between the antenna and the processing circuitry;
    the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

16. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

17. The communication system of the previous embodiment further including the base station.

18. The communication system of the previous 2 embodiments, further including the UE, wherein the UE is configured to communicate with the base station.

19. The communication system of the previous 3 embodiments, wherein:

the processing circuitry of the host computer is configured to execute a host application, thereby providing the user data; and the UE comprises processing circuitry configured to execute a client application associated with the host application.

20. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

21. The method of the previous embodiment, further comprising, at the base station, transmitting the user data.

22. The method of the previous 2 embodiments, wherein the user data is provided at the host computer by executing a host application, the method further comprising, at the UE, executing a client application associated with the host application.

23. A user equipment (UE) configured to communicate with a base station, the UE comprising a radio interface and processing circuitry configured to performs the of the previous 3 embodiments.

24. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

25. The communication system of the previous embodiment, wherein the cellular network further includes a base station configured to communicate with the UE.

26. The communication system of the previous 2 embodiments, wherein:

the processing circuitry of the host computer is configured to execute a host application, thereby providing the user data; and the UE's processing circuitry is configured to execute a client application associated with the host application.

27. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

28. The method of the previous embodiment, further comprising at the UE, receiving the user data from the base station.

29. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

30. The communication system of the previous embodiment, further including the UE.

31. The communication system of the previous 2 embodiments, further including the base station, wherein the base station comprises a radio interface configured to communicate with the UE and a communication interface configured to forward to the host computer the user data carried by a transmission from the UE to the base station.

32. The communication system of the previous 3 embodiments, wherein:

the processing circuitry of the host computer is configured to execute a host application; and the UE's processing circuitry is configured to execute a client application associated with the host application, thereby providing the user data.

33. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

34. A method implemented in a communication system including a host computer, a base station and a user equipment (UE), the method comprising:

at the host computer, receiving user data transmitted to the base station from the UE, wherein the UE performs any of the steps of any of the Group A embodiments.

35. The method of the previous embodiment, further comprising, at the UE, providing the user data to the base station.

37. The method of the previous 2 embodiments, further comprising:

at the UE, executing a client application, thereby providing the user data to be transmitted; and at the host computer, executing a host application associated with the client application.

38. The method of the previous 3 embodiments, further comprising:
　at the UE, executing a client application; and
　at the UE, receiving input data to the client application, the input data being provided at the host computer by executing a host application associated with the client application,
　wherein the user data to be transmitted is provided by the client application in response to the input data.

39. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

40. The communication system of the previous embodiment further including the base station.

41. The communication system of the previous 2 embodiments, further including the UE, wherein the UE is configured to communicate with the base station.

42. The communication system of the previous 3 embodiments, wherein:
　the processing circuitry of the host computer is configured to execute a host application;
　the UE is configured to execute a client application associated with the host application, thereby providing the user data to be received by the host computer.

43. A method implemented in a communication system including a host computer, a base station and a user equipment (UE), the method comprising:
　at the host computer, receiving, from the base station, user data originating from a transmission which the base station has received from the UE, wherein the UE performs any of the steps of any of the Group A embodiments.

44. The method of the previous embodiment, further comprising at the base station, receiving the user data from the UE.

45. The method of the previous 2 embodiments, further comprising at the base station, initiating a transmission of the received user data to the host computer.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

1×RTT CDMA2000 1× Radio Transmission Technology
　3GPP 3rd Generation Partnership Project
　5G 5th Generation
　AAS Active Antenna System
　ABS Almost Blank Subframe
　ARQ Automatic Repeat Request
　AWGN Additive White Gaussian Noise BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
CSI-RS Channel State Information Reference Signal
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
NZP-CSI-RS Non-zero power CSI-RS
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RI Rank Indication
RLC Radio Link Control
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDAP Service Data Adaptation Protocol
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WD Wireless Device
WLAN Wide Local Area Network It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are

What is claimed is:

1. A method in a network node for timing compensation of a co-polarized antenna pair, the method comprising:
   transmitting a first Channel State Information Reference Signal, CSI-RS, having a first timing compensation and transmitting a second CSI-RS having a second timing compensation;
   receiving a CSI-RS resource indicator, CRI, in a CSI report from a wireless device, WD;
   determining from the CRI which of the first and second timing compensation results in a greater spectrum efficiency;
   configuring the WD to restrict a time for channel measurement to prevent channel measurement across multiple sequentially transmitted CSI-RS; and
   iteratively performing the transmitting, receiving and determining until a timing compensation that results in a maximum spectrum efficiency at the WD is determined.

2. The method of claim 1, wherein the timing compensation that results in the maximum spectrum efficiency is determined according to a linear search algorithm.

3. The method of claim 1, wherein the timing compensation that results in the maximum spectrum efficiency is determined according to a non-linear search algorithm.

4. The method of claim 1, wherein the timing compensation that results in a maximum spectrum efficiency is determined periodically.

5. The method of claim 1, wherein determining a timing compensation that results in a maximum spectrum efficiency is performed for a first polarization of a set of co-polarized antenna pairs, followed by determining a timing compensation that results in a maximum spectrum efficiency for a second polarization of the set of co-polarized antenna pairs.

6. The method of claim 5, wherein, for each polarization, one antenna is used as a reference antenna and a timing compensation is determined for each antenna of a polarization relative to the reference antenna.

7. The method of claim 1, wherein the first and second timing compensation are incremental after a first iteration.

8. The method of claim 1, further comprising configuring the WD to make a channel measurement for reporting in an uplink timeslot based on a most recent occasion of a CSI-RS received by the WD.

9. A network node configured for timing compensation of a co-polarized antenna pair, the network node comprising:
   a radio interface configured to:
   transmit a first Channel State Information Reference Signal, CSI-RS, having a first timing compensation and transmitting a second CSI-RS having a second timing compensation; and
   receive a CSI-RS resource indicator, CRI, in a CSI report from a wireless device, WD; and
   processing circuitry in communication with the radio interface, the processing circuitry configured to:
   determine from the CRI which of the first and second timing compensation results in a greater spectrum efficiency;
   configure the WD to restrict a time for channel measurement to prevent channel measurement across multiple sequentially transmitted CSI-RS; and
   the processing circuitry and the radio interface are configured to iteratively perform the transmitting, receiving and determining until a timing compensation that results in a maximum spectrum efficiency at the WD is determined.

10. The network node of claim 9, wherein the timing compensation that results in the maximum spectrum efficiency is determined according to a linear search algorithm.

11. The network node of claim 9, wherein the timing compensation that results in the maximum spectrum efficiency is determined according to a non-linear search algorithm.

12. The network node of claim 9, wherein the timing compensation that results in a maximum spectrum efficiency is determined periodically.

13. The network node of claim 9, further comprising a set of co-polarized antenna pairs in communication with the radio interface, and wherein determining a timing compensation that results in a maximum spectrum efficiency is performed for a first polarization of the set of co-polarized antenna pairs, followed by determining a timing compensation that results in a maximum spectrum efficiency for a second polarization of the set of co-polarized antenna pairs.

14. The network node of claim 13, wherein, for each polarization, one antenna is used as a reference antenna and a timing compensation is determined for each antenna of a polarization relative to the reference antenna.

15. The network node of claim 9, wherein the first and second timing compensation are incremental after a first iteration.

16. The network node of claim 9, wherein the processing circuitry and the radio interface are configured to configure the WD to make a channel measurement for reporting in an uplink timeslot based on a most recent occasion of a CSI-RS received by the WD.

* * * * *